Aug. 14, 1923.  1,464,723
J. F. O'CONNOR
FRICTION SHOCK ABSORBING MECHANISM
Filed July 19, 1922
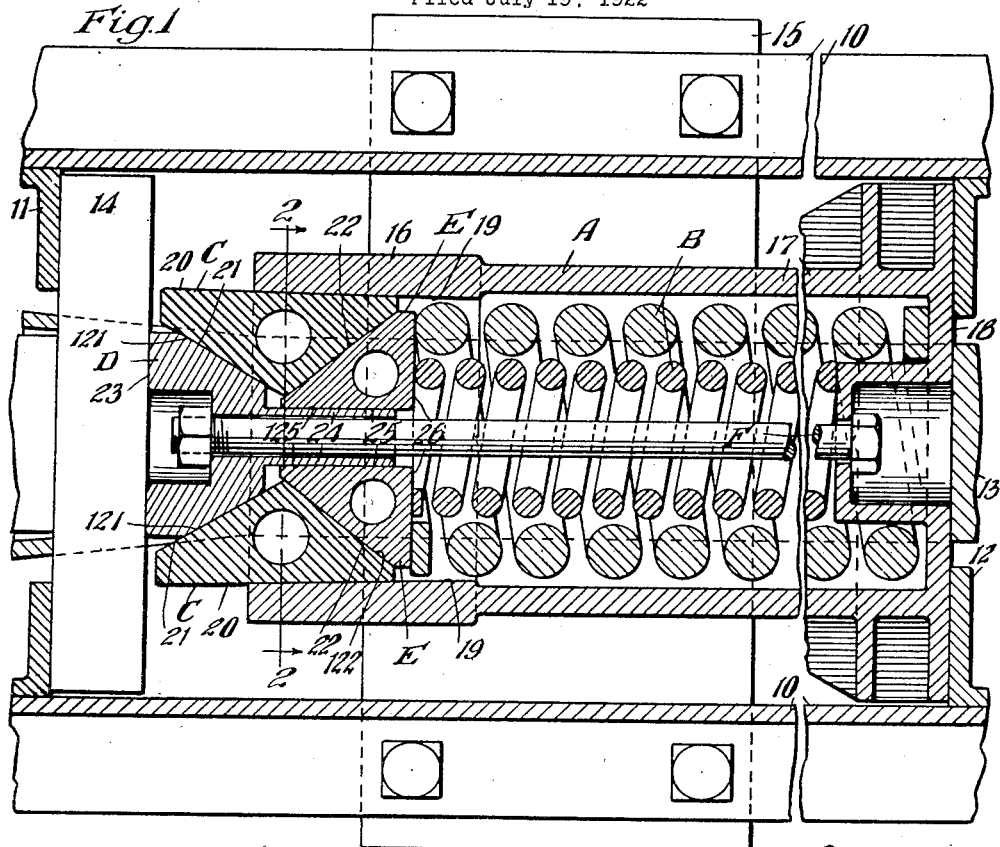
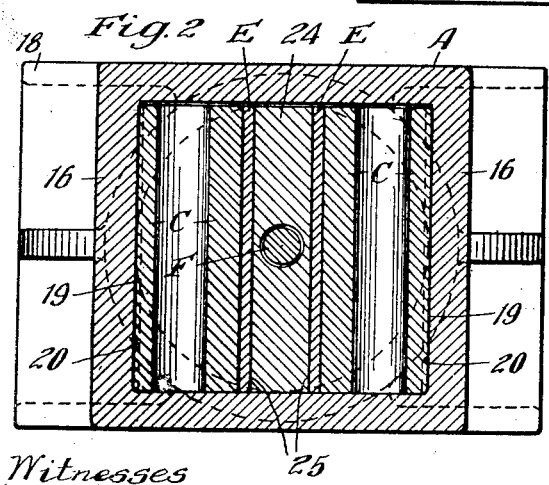
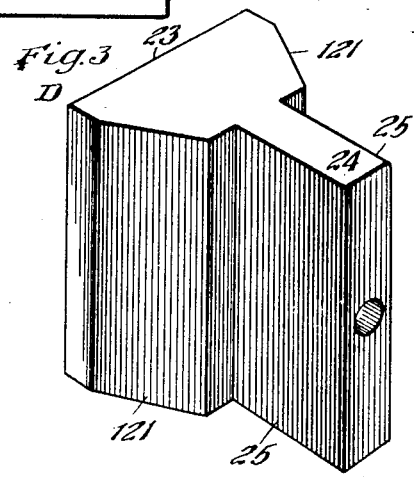
Witnesses
Wm. Geiger
Inventor
John F. O'Connor
By Geo. I. Haight
His Atty.

Patented Aug. 14, 1923.

1,464,723

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

Application filed July 19, 1922. Serial No. 575,961.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a high capacity friction shock absorbing mechanism especially designed for railway draft rigging and wherein also is insured easy and certain release.

A more specific object of the invention is to provide a mechanism of the character indicated having a wedging system wherein relatively blunt angled wedging faces may be used to insure the release and wherein also the elements of the wedging system are so associated and operated that the effective expansive action of the wedge system with relation to the shell is increased by friction generated within the wedge system itself.

Other objects of the invention will more clearly appear from the description and claims appearing hereinafter.

In the drawing forming a part of this specification, Figure 1 is a horizontal, longitudinal sectional view of a portion of a railway draft rigging, parts being broken away in order to prevent crowding. Figure 2 is an enlarged vertical transverse section of the shock absorbing mechanism proper and corresponding to the line 2—2 of Figure 1. And Figure 3 is a detail perspective of one of the elements of the wedging system employed in the mechanism shown in Figure 1.

In said drawing, 10—10 denote the usual channel draft sills of a railway car provided on the inner faces thereof with front stop lugs 11 and rear stop lugs 12. The shock absorbing mechanism proper is operatively associated with a drawbar by means of a hooded cast yoke 13, the shock absorbing mechanism being placed within the yoke as is also a front main follower 14. The yoke and associated movable parts are held in operative position by a detachable saddle plate 15.

The improved shock absorbing mechanism proper, as shown, comprises a combined friction shell and spring gage casting A; a spring resistance B; a pair of friction shoes proper C; an outer wedge D; a pair of inner wedges E—E; and a retainer bolt F. The casting A is of generally rectangular cross section and is formed at the outer end with a friction shell proper 16, rearwardly thereof with a spring cage proper 17, and at the rear end with an integral follower 18, the latter being laterally extended to cooperate with the stops 12 and suitably reinforced by ribs and webs. The shell proper is formed on the interior thereof with opposed friction surfaces 19—19 which are converged inwardly of the shell, as clearly shown in Figure 1.

Each of the friction shoes is formed on the outer side thereof with a longitudinally extending flat friction surface 20 cooperable with the corresponding adjacent friction surface 19, and on its inner side is formed with a rearwardly and inwardly extending wedge face 21 and also with a rearwardly and outwardly extending wedge face 22.

The outer wedge D is formed on its outer end with a flat bearing surface 23 engaged by the front follower 14 and inwardly thereof is provided with a pair of inwardly converging wedge faces 121—121 cooperable with the wedge faces 21 of the shoes C. The wedge member D is also provided with an inwardly extended thick web or flange 24 centrally disposed and provided with opposite friction surfaces 25—25 extending parallel to the axis of the gear.

Each of the wedges E is formed at its rear or inner end with a flat bearing surface 26 engaging the adjacent end of the spring B, with a wedge face 122 cooperable with the corresponding adjacent wedge face 22 of a shoe C, and on its inner side with a longitudinally extending flat friction surface 125 cooperable with the corresponding adjacent friction surface 25 of the outer wedge member D.

The wedge member D is suitably cored to accommodate the shank of the retainer bolt F which is anchored at one end to the wedge D and at its other end within a suitable cup or hollow boss formed integrally with the rear wall 18 of the casting A.

The operation is as follows, assuming a compression stroke of the mechanism. The wedges D and E and shoes C, together form what may be considered a wedge system wherein each element has wedge faced engagement with at least one other element of the system. As the entire wedge system is forced inwardly relatively to the friction shell proper 16, the shoes C will be forced to advance at a somewhat faster rate than the wedge D, due to the taper of the shell friction surfaces 19. A differential action is thus produced, as will be understood by those skilled in the art. As the shoes C are advanced inwardly of the shell relatively to the wedge D, the wedge members E will be correspondingly inwardly advanced relatively to the wedge D, thus generating friction between the wedge elements E and the wedge D on the friction surfaces 25 and 125. By this arrangement, I am enabled to employ relatively blunt angles on the wedge faces 21, 121; and 22, 122, thereby promoting easy release. At the same time, due to the friction generated because of the relative movement between the wedge D and wedges E, the effective expansive or radial pressure action of the wedging system is materially augmented, thus increasing the effective frictional capacity of the mechanism, as compared with other prior types of somewhat similar friction mechanisms having inner and outer oppositely disposed wedges cooperable with laterally disposed friction shoes.

I have herein shown and described what I now consider the preferred manner of carrying out the invention, but the same is merely illustrative and I contemplate all changes and modifications that come within the scope of the claims appended hereto.

I claim:

1. In a friction shock absorbing mechanism, the combination with a friction shell; of a spring resistance; and a friction-generating wedge system cooperable with the shell and movable relatively thereto, said system comprising a plurality of elements, certain of said elements cooperating directly with the shell and provided with inner wedge faces, and some of said elements sliding on each other to create friction additional to that generated by the wedge action proper, and provided with wedge faces directly co-acting with the wedge faces of said elements co-operating with the shell.

2. In a friction shock absorbing mechanism, the combination with a friction shell; of a spring resistance; and a friction-generating wedge system cooperable with the shell and movable relatively thereto, said system comprising, a plurality of elements each having a wedge face cooperable with a wedge face of another element, one of said elements having additional friction generating surfaces co-operable with additional friction generating surfaces of a plurality of said elements.

3. In a friction shock absorbing mechanism, the combination with a friction shell having inwardly converging friction surfaces on the interior thereof; of a spring resistance; a friction generating wedge system co-operable with the shell and movable relatively thereto, said system comprising, a wedge pressure transmitting means, a plurality of wedge elements having friction surfaces co-operating directly with said inwardly converging friction surfaces of the shell, and a plurality of wedge elements co-operable directly with said first named elements and sliding on each other to create friction additional to that created by wedge action proper.

4. In a friction shock absorbing mechanism, the combination with a friction shell having inwardly converging friction surfaces on the interior thereof; of a spring resistance; and a friction-generating wedge system cooperable with the shell and movable relatively thereto, said system comprising, a plurality of elements, each having a wedge face cooperable with the wedge face of another element, a plurality of said elements having also cooperable additional friction-generating surfaces.

5. In a friction shock absorbing mechanism, the combination with a friction shell; of a spring resistance; and a friction-generating wedge system cooperable with the shell and movable relatively thereto, said system comprising, inner and outer oppositely disposed wedges having frictional engagement with each other, and friction shoes cooperable with the shell and having wedge faced engagement with said inner and outer wedges.

6. In a friction shock absorbing mechanism, the combination with a friction shell having inwardly converging friction surfaces on the interior thereof; of a spring resistance; and a friction-generating wedge system cooperable with the shell and movable relatively thereto, said system comprising, inner and outer oppositely disposed wedges having frictional engagement with each other, and friction shoes cooperable with said inwardly converged friction surfaces of the shell, each shoe having wedge faced engagement with said inner and outer wedges.

7. In a friction shock absorbing mechanism, the combination with a friction shell having inwardly converged friction surfaces; of opposed friction shoes slidable on said shell friction surfaces, each shoe having inwardly and outwardly extending wedge faces on the inner side thereof; an outer wedge having wedge faces cooperable with the wedge faces of the shoes, at the outer ends of the latter, said wedge having also an inwardly extended web; a pair of inner wedges, each having a wedge face engageable with a wedge face of a shoe and a friction surface engageable with one side of said web; and a spring resistance engaging said inner wedges at one of its ends and adapted to yieldingly resist relative movement between said shell and said shoes and wedges.

In witness that I claim the foregoing I have hereunto subscribed my name this 30th day of June 1922.

JOHN F. O'CONNOR.

Witnesses:
  UNA C. GRIGSBY,
  ANN BAKER.